INVENTOR
DAVID JAMES

BY Nolte & Nolte
ATTORNEYS

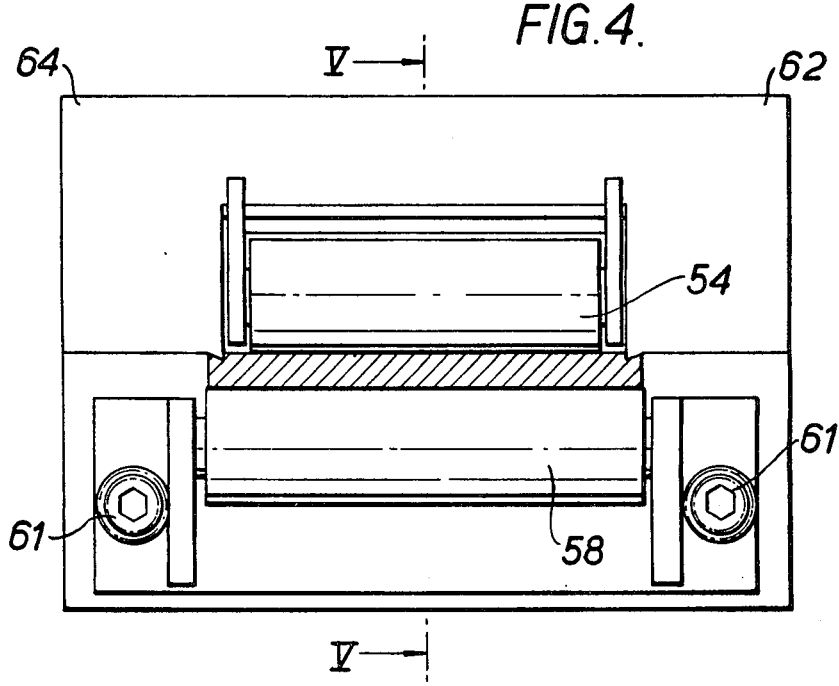
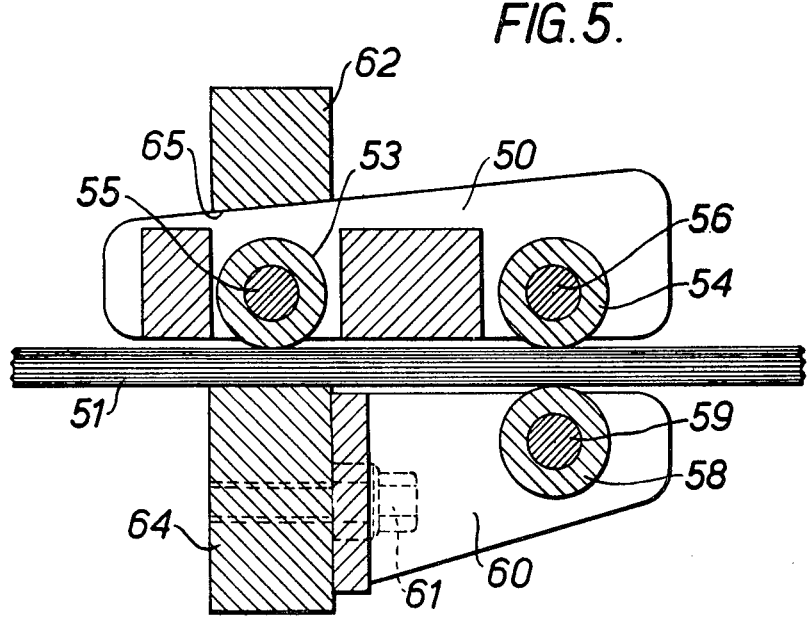

March 14, 1972   D. JAMES   3,649,418
METHOD OF AND A DEVICE FOR USE IN ADHESIVELY SECURING
TOGETHER THE SURFACES OF SUBSTANTIALLY
IMPERMEABLE MATERIALS
Filed July 2, 1969   3 Sheets-Sheet 3
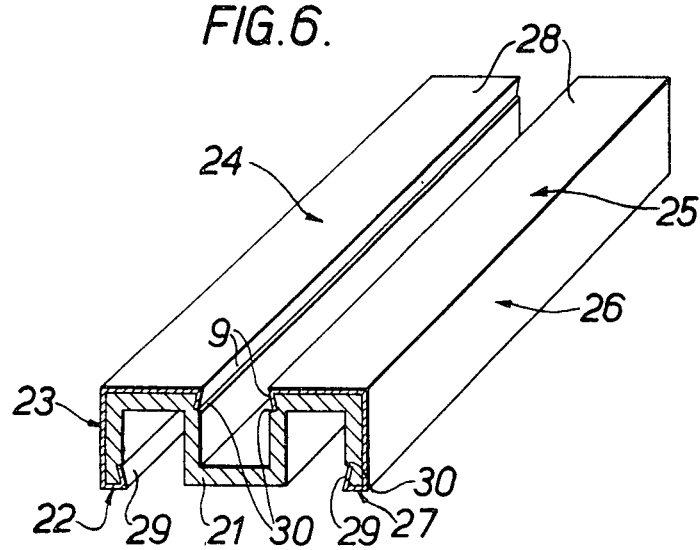
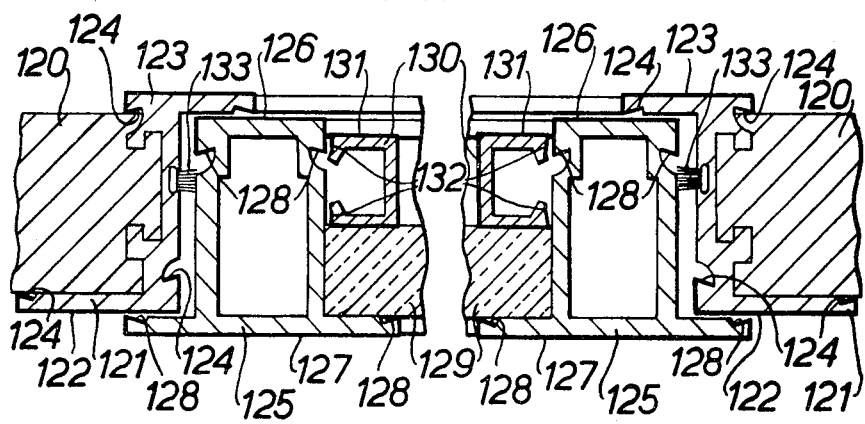
INVENTOR
DAVID JAMES
BY
Nolte & Nolte
ATTORNEYS United States Patent Office 3,649,418
Patented Mar. 14, 1972

3,649,418
METHOD OF AND A DEVICE FOR USE IN ADHESIVELY SECURING TOGETHER THE SURFACES OF SUBSTANTIALLY IMPERMEABLE MATERIALS
David James, Coychurch, near Bridgend, Glamorgan, Wales, assignor to Drawn & Rolled Sections Ltd., Bridgend, Glamorgan, Wales, Great Britain
Filed July 2, 1969, Ser. No. 838,484
Claims priority, application Great Britain, July 4, 1968, 31,932/68
Int. Cl. B31f 5/00; B32b 31/04
U.S. Cl. 156—580
3 Claims

ABSTRACT OF THE DISCLOSURE

In order to secure the surface of one metal article to the surface of another metal article, an adhesive substance containing a solvent is applied to either one or both surfaces in the form of a coating, and the surfaces are placed in contact so that a bond is formed between the surfaces. A bond so formed is likely to be unsatisfactory since the impermeability of the surfaces of the articles prevents the solvent from drying out fully at the interface between the coating layer and the metallic surface. Partial drying of the adhesive coating, and subsequently bringing together of the surfaces under pressure, known as impact adhesion, may improve the bond.

The method herein disclosed teaches the steps of coating the surfaces with an adhesive coating, drying out the adhesive coatings fully by evaporation of the solvent including curing where necessary or preferred, then applying a thin film of solvent to each layer, and finally placing the surfaces together under pressure to form a bond.

By this method, a more reliable bond may be easily formed between each metallic surface and its coating, and subsequently a further bond is formed between the adhesive coatings in the region of their respective superficial faces. The quantity of solvent in the film being such that the bond between the adhesive coating and the metallic surface is not impaired. A device is disclosed by which the step of placing the surfaces together under pressure is advantageously carried into effect.

BACKGROUND OF THE INVENTION

This invention relates to a method of adhesively securing together the surfaces of substantially impermeable materials.

In adhesively securing together the surfaces of two members of impermeable materials, such as metals, a problem may arise from the use of adhesive substances including a solvent which evaporates during the formation of the adhesive bond. To secure such materials together, it is necessary in many cases to coat both surfaces of the materials with the adhesive substance containing the solvent and to leave the coatings to partially dry before bringing the surfaces into contact to form the bond. Such adhesive substances are generally known as impact adhesives.

Difficulty can be experienced in making a durable and stable bond if, once the surfaces are placed together, there is no way of escape for the solvent, particularly where the shape of the surfaces at the intended joint is such as to render difficult or impossible thorough drying out of the solvent after mating of the surfaces.

The present invention seeks to provide a method of adhesively securing together the surfaces of substantially impermeable material by means of which a durable and stable bond can be formed. Such incomplete drying-out seriously prejudices the reliability of the bond between the coating and the coated surface.

SUMMARY OF THE INVENTION

According to the invention there is provided a method of adhesively securing together the surfaces of substantially impermeable materials, which comprises the step of coating each of the surfaces of the materials with an adhesive substance containing a solvent, causing or permitting the adhesive coatings on the surfaces to fully dry by evaporation of the solvent, thereafter applying a thin film of the solvent to at least one of the surfaces, and bringing the surfaces together under pressure to form a bond.

When the adhesive coating on an impermeable surface is allowed to fully dry by evaporation of the solvent originally present in the adhesive, the adhesive coating itself forms a layer which is bonded in the region of one face to the impermeable surface and which provides a hard surface at its superficial surface.

The thin film of solvent is applied to said hard surface of said bonded adhesive layer to restore adhesive properties to the hard surface of said bonded adhesive layer.

Thus, by referring to a thin film of solvent, it is intended that the solvent should be distributed over the hard surface of said bonded adhesive layer in a quantity such that the adhesive properties of the layer are restored only in the immediate surface region of said hard surface, in a quantity insufficient to penetrate the bonded adhesive layer to such an extent that the bond formed between the coating and the impermeable surface is impaired.

There is further provided a device for use in adhesively securing together the surfaces of substantially impermeable materials, comprising, a first member and a second member, a rotatable pressure element carried by said first member, a support surface formed on said second member, a first and a second abutment portion on said first and second members respectively, said members being adapted to be arranged with said abutment portions for mutual contact slideable in a direction inclined to said support surface, whereby said rotatable pressure element and said support surface can be selectably spaced apart by a sliding displacement of said first abutment portion relative to said second abutment portion, variation of said spacing effecting a corresponding variation in the pressure which can be exerted on articles inserted between said rotatable pressure element and the support surface.

BRIEF DESCRIPTION OF THE DRAWINGS

Embodiments of the invention will now be described with reference to the accompanying drawings, in which:

FIG. 4 is an end view of a pressure device for assisting in the bonding of the cladding to a body member;

FIG. 5 is a sectional view on the line V—V of FIG. 4;

FIG. 6 is a perspective view of a short length of one example of cladded or faced member in which the facing is conveniently bonded by the method of the invention; and FIG. 7 is a plan sectional view of a window frame made up of a number of constructional members faced or cladded by the bonding method of the invention.

DETAILED DESCRIPTION OF EMBODIMENTS

In the preferred example of the method of bonding according to the invention the surface of the impermeable material to be bonded are coated with adhesion promoting substance including a solvent to render it fluid, leaving the surfaces sufficient time, possibly even 1 or 2 days, to dry out thoroughly the adhesive substance, i.e. to allow the solvent to be fully flashed off, applying to the surface of at least one of these adhesive coatings a thin film of solvent, and almost immediately thereafter bringing the two surfaces together under pressure to form the bond. Conveniently, when facing elongated members such as are above described, the member and the facing can be fed after reactivation of the adhesive coatings to a wrapping or binder die in which the facing is progressively bonded about the elongated member.

Figure 1:
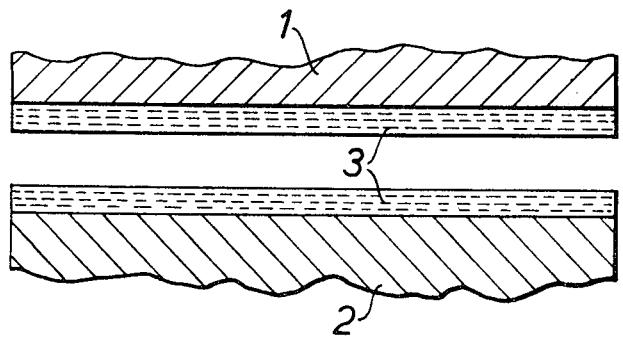
FIG. 1 is a sectional view illustrating schematically two impermeable surfaces coated with an adhesive substance containing a solvent.

It has been found that by the adoption of this method, a very satisfactory and durable bond can be achieved and it is believed that the reason for the success of this bonding method is as follows:

Referring now to FIG. 1, there are shown two surfaces 1 and 2 of impermeable material on each of which a coating 3 of an adhesive substance including a solvent has been applied. A suitable adhesive substance for this purpose where, for example, stainless steel foil is to be bonded to an aluminium alloy, is a neoprene based adhesive known as AS 120, which adhesive substance of course, incorporates a solvent.

Figure 2:
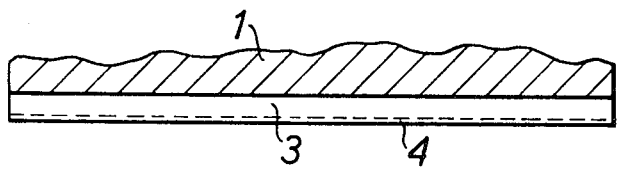
FIG. 2 is a sectional view illustrating schematically an impermeable surface having an adhesive coating thereon after the application of solvent to the previously dried adhesive.

The materials are left until the adhesive substance has substantially hardened, throughout the whole thickness of the adhesive coating, which may, for example, take between 1 and 2 days. Once this hardening is completed, a strong bond is promoted between the material surface and the coating. To complete the bond between the surfaces, it is necessary to ensure a good bond between the two coatings. In order to carry this out, the surfaces of the coatings 3 are softened by applying a thin film of a solvent to one or both of the now hardened adhesive layers. The effect of applying such solvent is shown in FIG. 2, where it will be seen that the solvent has only penetrated the outer skin 4 of the coating. This is all that is required and it is undesirable to use sufficient solvent to penetrate too deeply into the coating.

Figure 3:
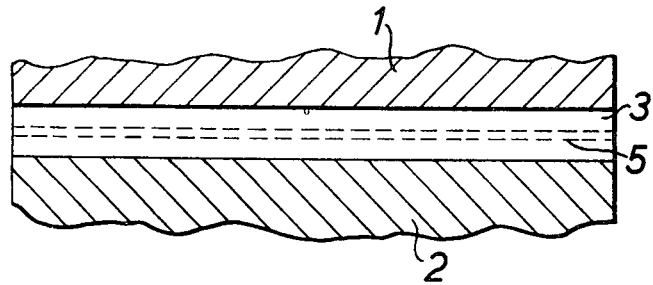
FIG. 3 is a schematic sectional view showing two surfaces which have just been bonded together showing the softened part of the adhesive.

As soon as the solvent has been applied, the two surfaces are pressed together and, as will be seen from FIG. 3, the softened outer portion of the coating will come together to form a bond as indicated at 5. If on the other hand, only one of the coatings has been coated with the solvent, the solvent from this coating will penetrate the outer portion of the other coating to the same effect. The bond will be fully formed by the dispersal of the solvent through the much deeper hardened coating 6 upon which, by virtue of the relatively small amount of solvent used, it will have little effect.

The drying out time for various adhesive substances will of course vary and some of these substances may need to be heat cured, for example, in an infrared tunnel. However, heat curing must only be used on adhesive substances, where its effect can be partially reversed by the further application of the solvent. Any suitable adhesive substance containing a solvent can be used in this way.

In general, the method of the invention is suitable for adhesively securing together surfaces of impermeable materials, such as metals, and is particularly suitable for use in bonding the facings or cladding of elongated articles which may be used as constructional members. Such constructional member may, for example consist of an elongated member of an aluminium alloy and a facing of stainless steel foil. It is to be understood that, however, the invention is not limited to any such construction or the bonding together of the two stated materials.

When using a wrapping or binder die as abovementioned, additional pressure between the facing and the elongated member may be required for certain areas of the bond. A suitable device for this purpose is shown in FIGS. 4 and 5.

The device of FIGS. 4 and 6 comprises a first member designated a member 50 which is supported on the elongated member 51 an article by two rotatable pressure elements, in this case roller members 53 and 54. Conveniently the roller members 53 and 54 are mounted on stationary shafts 55 and 56 between which and the roller members are roller bearings (not shown). Beneath the elongated member 51, there is positioned a stationary roller member 58 which is of similar construction to the rollers 54 and is thus mounted on a shaft 59 supported by a bracket 60 bolted by bolts 61 to the entrance side 62 of a second member, in this embodiment a wrapping or binder die indicated generally at 64. As can be seen, an abutment portion of the wedge shaped member 50 engages an abutment portion of the die 64, in this embodiment the flare 65 as shown.

The contacting surfaces of the member 50 and the flare 65 are maintained in parallel contact owing to the roller members 53 and 54 aligning the member 50 by bearing on the elongate member 51. Alternatively, the flare 65 may be provided with a rail-like member (not shown) which engages a groove (not shown) in the member 50, whereby said contacting surfaces are positioned in parallel contact.

In use, the member 50 is placed on the elongated member and pushed into the flare 65. The movement of the elongated member tends to force the member 50 into the flare to provide a wedging action and add to the pressure exerted by the die 64 itself. The angle of the wedge is preferably very small.

As previously mentioned, the preferred example of the invention is particularly suitable for facing or cladding elongated articles of impermeable material with an impermeable cladding. Such an article is shown in FIG. 6.

As shown in FIG. 6, the article comprises a constructional member comprising an aluminium alloy body 21 of a zig-zag section having its surfaces 22 to 27 faced with a light gauge stainless steel foil facing. A suitable thickness of such a foil is 0.0148 inch or 28 gauge but it has been found that such stainless steel foil cladding is suitable up to a maximum thickness of .025 inch. The stainless steel foil is bonded to the aluminium body as previously described.

As can be seen, the stainless steel facing extends beyond the edges of the surfaces to be faced and is bent inwardly at 29 which bent portions assist in maintaining the bond, protecting the edges of the surfaces and providing a smooth edge. To facilitate a proper fold back of the edges 29 of the stainless steel foil, the body 21 is indented at 30 to receive these edges 29.

In making such a constructional member, both the body member 21 and the foil after having been adhesively coated and reactivated by the additional application of solvent, are passed through a wrapping or binder die in which the foil will be appropriately shaped to the body member and adhesion will be caused by the application in the die of the necessary pressure. Where additional pressure is required for bonding, for example, on part of a facing, additional pressure means such as that shown in FIGS. 4 and 5 may be provided in or adjacent to the die. The foil may be pre-shaped so as to be partially in the required shape for adhesion to the body or it may in fact be over-shaped in order to prevent pulling off the facing from the body member 1 as a result of tension caused in the facing during its passage through the die thus ensuring a satisfactory and durable bond.

Any pre-shaping or over-shaping normally takes place prior to the application of the adhesive substance. The surfaces to which the adhesive substance are to be applied may be suitably abraded to form a key for the adhesive substance by means for example of the material known under the registered trademark "Scotch Brite."

The pad may be urged against the surfaces just prior to or in the pre-shaping die.

FIG. 7 shows the use of several different constructional members constructed as previously described in the construction of building members, in this case an opening window. The window is shown in sectional plan view, the window being hinged above the section and having its opening edges below. In this figure, 120 indicates the wall in which the window is situated. The fixed part of the frame is constructed of four identical constructional members, two of which are shown at 121 and have two faced portions 122 and 123 (shown by darker lines), each of which provide a facing for the frame on both sides of the wall 120. The edges of these facings are bent inwardly at 124.

The hinged portion of the window is also made up of four constructional members, two of which are shown at 125 having two oppositely positioned facings 126 and 127 also bent inwards at their edges at 128.

Glass 129 is held in the window by retaining members 130 which are also faced as at 131. Because of the position of these members and their shape and size, no special indentation is provided for the edges 132. A sealing member is provided between the fixed frame and the opening frame as indicated at 133.

From the foregoing description, it will be seen that adhesive securing together of the surfaces of impermeable materials can be carried out satisfactorily by the method described. As has also been described, the method of the invention is particularly applicable to the cladding of an elongated article with a suitable facing, which may well be other than the proposed facing of aluminium alloys by stainless steel foil, for use as constructional members in the construction of building components such as windows, doors and the like.

I claim:
1. A device for adhesively securing together surfaces of elongated articles, comprising:
   a first member and a second member;
   a rotatable pressure element on said first member for supporting said first member on said articles on a first surface portion thereof;
   a support surface on said second member for engaging said articles co-operatively with said rotatable pressure element at a second surface portion of said articles, said second surface portion facing in the opposite direction to said first surface portion;
   feed means for feeding said articles between the rotatable pressure element and said support surface;
   a first abutment surface on said second member facing towards said support surface and so inclined thereto as to form an acute angle therebetween so that the distance between said first abutment surface and said support surface decreases in the direction of feed of said articles between the rotatable pressure element and said support surface; and
   a second abutment surface on said first member in an oppositely facing relationship to said first abutment portion and adapted for slidable contact therewith, said second abutment surface being disposed between said first abutment surface and said rotatable pressure element, whereby on feeding of said articles between said rotatable pressure element and said support surface a wedging action is obtained between said first and said second abutment surfaces.

2. A device as defined in claim 1, comprising a planar surface on each of said abutment portion.

3. A device as defined in claim 2, comprising a pair of rotatable pressure elements carried by said first member each so disposed that, when the device is in use, said planar surfaces are mutually parallel.

References Cited
UNITED STATES PATENTS

| | | | |
|---|---|---|---|
| 2,422,676 | 6/1947 | Haman et al. | 156—582 X |
| 2,680,470 | 6/1954 | Stanton | 156—582 X |
| 3,143,454 | 8/1964 | Hannon | 156—582 X |
| 2,334,963 | 11/1943 | Spinner et al. | 156—582 X |
| 3,492,182 | 1/1970 | Howard | 156—582 X |

CARL D. QUARFORTH, Primary Examiner

E. E. LEHMANN, Assistant Examiner

U.S. Cl. X.R.

156—580; 100—168, 210